United States Patent [19]

Cushing et al.

[11] Patent Number: 5,196,469

[45] Date of Patent: Mar. 23, 1993

[54] ETHYLENE/VINYL ALCOHOL COATINGS

[75] Inventors: Virginia P. Cushing, Milford; Daniel Siegel, Stratford, both of Conn.

[73] Assignee: Mica Corporation, Stratford, Conn.

[21] Appl. No.: 680,101

[22] Filed: Mar. 28, 1991

[51] Int. Cl.⁵ .......................... C08K 5/05; C08K 5/09; C08L 23/08; C08L 29/02

[52] U.S. Cl. ................... 524/300; 427/407.1; 427/411; 427/412.5; 524/321; 524/389; 524/522

[58] Field of Search ............... 524/389, 390, 321, 522; 427/407.1, 411, 412.5

[56] References Cited

U.S. PATENT DOCUMENTS

| | | | |
|---|---|---|---|
| 3,941,730 | 3/1976 | Solenberger | 524/321 |
| 4,347,332 | 8/1982 | Odorzynski et al. | 524/522 |
| 4,772,663 | 9/1988 | Marten et al. | 526/329.5 |
| 5,134,036 | 7/1992 | Uemura | 428/515 |

Primary Examiner—Paul R. Michl
Assistant Examiner—Andrew E. C. Merriam
Attorney, Agent, or Firm—Bryan Cave

[57] ABSTRACT

A semi-aqueous ethylene-vinyl alcohol coating composition that is a stable, homogeneous solution which is capable of being easily applied to a substrate to form a multi-layer structure at room temperature, by spray, rod, gravure, or other mechanical means. Upon evaporation of the volatile components, this coating solution leaves a clear, homogeneous film comprising EVOH. The film resists degradation and discoloration during the lifetime of the structure, and upon incineration or recycling does not evolve harmful acids into the environment.

9 Claims, No Drawings

ETHYLENE/VINYL ALCOHOL COATINGS

FIELD OF THE INVENTION

This invention relates to multi-layer structures, which afford protection to products during transportation, storage and use. Such structures may be rigid or flexible, e.g., films, and offer protection against contamination, leakage, spoilage, and degradation from light, moisture and gases. Alternatively, the structures may be in the form of a vessel in which a product may be further processed, as by heat treatment or the like. Such multi-layer structures have, in the past, been made from paper, plastics, metal and/or glass. When paper and plastics are used as substrates they have frequently been used in conjunction with polyvinylidene chloride ["PVDC"] or a copolymer of ethylene and vinyl alcohol ["EVOH"].

BACKGROUND OF THE INVENTION

The packaging industry in general finds many applications for multi-layer structures which combine different materials with varying properties designed to provide complex barrier functions.

Metals, particularly aluminum and steel, have been used extensively, typically in the form of cans. As an alternate, aluminum, in the form of foil, has been widely used in other types of packages, especially flexible packaging. Metals protect the contents of a package from external sources of potential contamination such as light, moisture and gases, while simultaneously maintaining a constant atmosphere inside the package by preventing escape of volatile components.

However, there are limitations to the usefulness of metals as barrier materials. One problem is flex cracking, where fractures in the metal defeat barrier properties. Another problem is that one encounters recycling difficulties when a metal foil is disposed within a composite multi-layer structure.

PVDC has been known in the industry as a material by which good barrier properties may be obtained, in lieu of aluminum foil. Aqueous PVDC dispersions or solvent-borne PVDC solutions are easy to apply and form clear, continuous films. However, during the lifetime of a PVDC-containing structure, degradation of the PVDC has been observed. PVDC films discolor upon aging, exposure to light, and exposure to certain agents. When PVDC breaks down, hydrochloric acid is generated, which may then result in acid contamination of the package contents. Further, there has been environmental criticism based upon liberation of hydrochloric acid upon the incineration of multi-layer structures containing PVDC.

EVOH is another polymeric resin that has been shown to provide barrier protection to multi-layer packaging structures. See, for example, Sogi et al U.S. Pat. No. 3,560,325, granted Feb. 2, 1971; and Schroeder U.S. Pat. No. 4,254,169, granted Mar. 3, 1981. EVOH imparts good barrier properties to a structure, and also provides a clear, glossy film. There is no break-down of the polymer to release acid. Nor is there acid contamination of either the package contents or the environment. Films of EVOH are not known to discolor.

EVOH is an attractive alternative to metal foils and PVDC in the packaging industry because it does not exhibit the foregoing disadvantages.

EVOH has typically been applied to composite structures by extrusion coating. However, there are many instances where it is not practical to extrusion coat a substrate with resin. For example, it may be necessary to use one or more adhesive layers to adhere the extruded EVOH to other substrates. This calls for sophisticated, expensive co-extrusion equipment. Further, EVOH should not be processed at temperatures exceeding 500° F. because oxidation and/or degradation of the polymer may take place. Extrusion and co-extrusion expose the resin to elevated temperatures and thus pose a risk of EVOH degradation which results in inferior barrier performance.

EVOH may also be utilized to replace PVDC in multi-layer structures. PVDC is normally applied as a liquid coating. Thus, there is a need in the art for EVOH in liquid form so that it can be applied as a liquid coating.

The prior art reflects various attempts to incorporate EVOH into solutions. Thus, EVOH has been dissolved in mixtures of alcohol and water. However, the resulting solutions are unstable, i.e., the resin precipitates out of solution after a day or so. Another difficulty posed by such solutions is that they do not form very satisfactory films when applied by rod, gravure or similar devices, followed by drying. Instead of obtaining clear and even films, the resulting films exhibit uneven leveling, partial opacity, streaks and voids. Moreover, the solutions must be heated prior to application to a substrate.

The use of a 5-10% solution of an EVOH resin in water, formic acid and isopropanol has also been described in the literature (Modern Plastics, February 1986, page 80) as providing an oxygen barrier by dip coating. It has, however, been found in accordance with the present invention (see Controls E, I and K in the tabulation below) that formic acid- and isopropanol-containing EVOH solutions do not form uniform, high quality EVOH barrier films.

Accordingly, it is among the objects of the present invention to provide an improved EVOH-containing coating solution and a method of coating substrates (e.g., films, pre-formed articles or the like) therewith for forming EVOH barrier coatings for films, rigid containers or other multi-layer structures.

SUMMARY OF THE INVENTION

The present invention provides a semi-aqueous EVOH coating composition that is a stable, homogeneous solution which is capable of being easily applied to a substrate to form a multi-layer structure at room temperature, by spray, rod, dip, gravure, or other mechanical means. The composition comprises up to about 20% of an EVOH resin dissolved in a carrier comprising about 30-90% n-propanol or secondary butanol; about 0.5-20% of a $C_2$ to $C_8$ carboxylic acid, a mineral acid or a polymeric acid; and about 5-45% water, all percentages being by weight of the entire solution. Upon evaporation of the volatile components, this coating solution leaves a clear, homogeneous film comprising EVOH. The film resists degradation and discoloration during the lifetime of the structure, and upon incineration or recycling does not evolve harmful acids into the environment.

The EVOH coatings hereof may be adhered directly to various substrates, e.g., nylon; alternatively, they may be adhered to other substrates by appropriate treatments. Preferably, in accordance with a further feature of the present invention, the EVOH coatings are adhered to a variety of different paper and/or plastic substrates by using a suitable priming agent such as polyethyleneimine, an organosilane, an organotitanate, or the like.

DETAILED DESCRIPTION OF THE INVENTION

For the purposes of the preferred embodiments of the coating composition of the invention, the EVOH resin desirably contains from about 27 to 48 mol percent ethylene copolymerized with correspondingly, from about 73 to 52 mol percent vinyl alcohol. The melt index of these resins is generally about 0.6 to 16 decigrams per minute at 200° C.

The desired resin may be modified by blending with other resins such as carboxylate or polyamide polymers to improve adhesion, or by adding mica which lowers cost and may enhance barrier properties.

The maximum amount of resin that may be used is limited by the final solution viscosity. The viscosity should be under about 15,000 centipoise at 25° C., i.e., low enough to insure that the solution is pourable and machinable. The viscosity is a function of the reagents selected. Generally, from about 0.5 to 20 weight % of the copolymer resin is used, preferably from about 5 to 15 weight %.

Critical to dissolution of the EVOH resin is the use of a carrier a major proportion of which (30-90%, preferably 35 to 45%, by weight of the final solution) comprises n-propanol or secondary butanol. As indicated below, other alcohols (see Controls C-H, K and L in the tabulation below), even with co-solvents (see Controls K and L in the tabulation), have been found incapable of forming stable solutions from which good EVOH films may be deposited.

The further, acid component of the coating composition is chosen for ease of handling and miscibility with water and the alcohol solvent component. In certain instances, the boiling point of the acid may be important. Where residual acid is harmful when retained in a structure, it is desirable to drive off the acid upon evaporation of the solvent. In such cases, an acid is selected having a sufficiently low boiling point to permit such evaporation. However, sometimes retention of the acid is beneficial. For example, a polymeric acid may be selected to impart adhesion, rheologic properties, leveling, slip, durability, hardness, gloss and/or water resistance to the system; in such cases, the acid is not evaporated from the final coating.

Acids that may be used in the composition include any one or a mixture of the following:

(i) A monobasic or dibasic carboxylic acid containing from two to eight carbon atoms, including both aliphatic and aromatic (e.g., phthalic) acids, and anhydrides thereof. Preferably, the acids useful herein comprise those having normal, secondary or tertiary $C_2$-$C_5$ hydrocarbon backbones, and include both saturated and unsaturated monocarboxylic (e.g., acetic, propionic, butanoic and pentanoic) and dicarboxylic (e.g., oxalic, malonic, succinic, glutaric, adipic, maleic, fumaric and phthalic) acids.

(ii) Mineral acids, including (but not limited to) hydrochloric acid, hydrobromic acid, hydrofluoric acid, hydroiodic acid, phosphoric acid, sulfuric acid and nitric acid.

(iii) Polymeric acids including, e.g., ethylene/acrylic acid copolymer, ethylene/methacrylic acid copolymer, polyacrylic acid, and carboxylated polyolefins, as well as anhydrides of such acids.

It is preferred to employ the carboxylic acids of group (i) in the composition of this invention. Whichever acid is employed, it is utilized in an amount of from about 0.5 to 20 weight %, preferably from about 5 to 15 weight %.

Finally, water is incorporated in the coating composition in an amount of about 5 to 45 weight %, preferably from about 35 to 45 weight %, thereof. Water is added to assist in dissolving the EVOH resin; it is also useful for reducing the flashpoint, odor and cost of the solution, and for environmental reasons. It is, however, important to limit the amount of water in the carrier for the EVOH resin; the use of even 50% water in the solution results in the deposition of films of relatively poor quality (see Control J in the tabulation below).

The liquid coating composition of the invention is prepared by admixing the EVOH resin with the aforesaid alcohol, acid and water constituents (in any desired sequence), and heating the resulting mixture to achieve solution. The coating solution thus compounded may be applied to a wide variety of flexible or rigid substrates comprising, for example, paper or other cellulosics, e.g., cellophane, cellulose acetate, butyrate or propionate; olefin polymers such as polyethylene, polypropylene or polybutylene, chlorinated-fluorinated ethylene polymers (e.g., "Aclar" made by Allied-Signal Corporation), or ethylene interpolymers, e.g., ethylene/vinyl acetate, ethylene/acrylic acid or ethylene/ethyl acrylate copolymers or interpolymers of ethylene, methyl acrylate, vinyl acetate and acids such as acrylic acid or methacrylic acid; other acrylic polymers, such as polyacrylonitrile; vinyl polymers such as polyvinyl chloride or polyvinylidene chloride; styrene polymers, e.g., polystyrene or styrene/acrylonitrile copolymers; polyesters; polyamides; polycarbonates; or ionomers.

With the principal exception of nylon, neither the EVOH solution nor EVOH extruded resin bonds well to plastic surfaces. Therefore, in accordance with another aspect of this invention, a priming agent is employed, preferably polyethyleneimine ("PEI") such as BASF Polymin P, a PEI product with a viscosity of 17,000 to 28,000 centipoise. PEI may be used as is, or may be chemically modified (as by crosslinking) with epoxy, melamine or aldehyde. Likewise, an organofunctional silane, e.g., N-beta-(aminoethyl)-gamma-aminopropyltrimethoxysilane, a chemically modified (e.g., crosslinked) organofunctional silane, an organofunctional titanate such as an acetylacetonate chelate marketed as Tyzor GBA by DuPont, a chemically modified (e.g., crosslinked) organofunctional titanate, or mixtures of such materials may be used. The use of such priming agents results in a high adhesive bond between the substrate and the EVOH.

In many cases in which multi-layered structures are desired, e.g., in the formation of recyclable bottles or other Products, it is often useful or necessary to employ interpolymers, e.g., interpolymers of ethylene, methyl acrylate, vinyl acetate and acids such as acrylic acid or methacrylic acid, as tie layers to improve the bonds between the several layers. For example, in making a plastic container the multi-layer structure may be formed by the co-extrusion of:

Polypropylene/Tie Layer/EVOH/Tie Layer/Polypropylene, followed by blow molding to form a shaped container.

In a similar way the EVOH solution of the present invention may be used in the formation of such a multilayer structure comprising the following layers:

Polypropylene/PEI Primer/EVOH coating solution (see Ex. 1 below, for example)/Co-extruded Tie Layer and Polypropylene.

The following examples further illustrate the advantages of the invention, that is, the application of a stable EVOH coating to form a multi-layer structure, and applications using such a coating. In the examples, the reactants were charged into a suitable vessel equipped for heating, refluxing, and mixing. The mixtures of reactants were heated to the boiling point and refluxed until the resins dissolved. The solutions were then cooled to room temperature, forming clear, homogeneous coating compositions. In the examples (as well as the preceding description) all parts and percentages are given by weight of the EVOH coating solution, unless otherwise specified.

EXAMPLE 1—EVOH Coating Solution

To a 500 ml three-neck round bottom flask equipped with a stirrer, heating mantle, thermometer and condensing tube, the following materials were charged: 25g (10 weight %) of an ethylene/vinyl alcohol resin containing 30 mol percent ethylene and having a melt flow of 3 decigrams/min at 210° C., 125 ml (40 weight %) n-propanol, 25 ml (10 weight %) glacial acetic acid and 100 ml (40 weight %) water. The mixture was heated, with agitation, to 90° C. and held at that temperature for one hour. The solution was then cooled to room temperature.

The resulting solution was a clear, homogeneous liquid and was stable for over three months. Draw-downs were made with the liquid using a #10 wire wrapped rod onto nylon. A clear, continuous film was observed after evaporation of the volatile components and the adhesion to nylon was excellent.

EXAMPLE 2—EVOH Coatings

In a separate experiment, the coating made in Example 1 was tested for adhesion to a variety of substrates including paper, polyester, polyethylene, ethylene/vinyl acetate copolymer, and polypropylene. The coating was drawn down on these substrates using a #10 wire wound rod, followed by thorough drying.

Clear, continuous films were made in each case. The adhesion of the coating to these substrates was only poor to fair. Excellent adhesion was achieved, however, by priming prior to coating. A suitable primer was MICA A-131-X, by Mica Corp., a chemically modified PEI based system. The liquid primer was applied and dried before application of the EVOH coating.

EXAMPLE 3—Multi-Layer Structures Incorporating EVOH Coatings

Primers are also effective for obtaining adhesion of secondary substrates to the EVOH coating after the EVOH has been applied and dried. For example, a useful multi-layer structure is obtained by priming polyethylene terephthalate ("PET") polyester film with a PEI primer, drying, then coating with the liquid EVOH from Example 1, drying, then coating with another thin film of PEI primer, drying, and then adhering a film of polyethylene ("PE") by lamination or extrusion coating thereon. This multi-layer structure can be described as:

PET/PEI Primer/EVOH Coating/PEI Primer/PE.

In one specific embodiment such a structure was prepared as follows:

(a) Using 48 gauge Mylar LBT polyester film (Du Pont), a thin layer of MICA A-131-X was applied using a smooth stainless steel rod, and dried with a warm air blower.

(b) To the primed surface, a solution from Example 1 was applied using a number 10 wire wound rod, and dried using a warm air blower.

(c) To the coated surface from (b), a thin film of MICA A-131-X was applied with a smooth stainless steel rod and dried using a warm air blower.

(d) A film of polyethylene which had been corona-treated was placed on top of the sample from (c) above, with the corona-treated side down.

(e) This combination of films, protected with release papers, was then placed between the jaws of a Sentinel Heat Sealer. The Sealer was set at 50 psi, 275° F., for 3 seconds dwell time.

(f) After cooling to room temperature the combined layers were observed to be inseparable.

CONTROL A—EVOH Coating Deposited from Solution in n-Propanol and Water

Using the same equipment described in Example 1, 15 g (6 weight %) of the resin used in Example 1, 200 ml (63 weight %) of n-propanol and 77.5 ml (31 weight %) water were charged into the reaction vessel. The mixture was heated with agitation to 88° C., held at that temperature for one hour and then cooled to room temperature.

The resulting solution turned from clear to milky white after 48 hours, and the resin precipitated out of the liquid. Draw-downs were made onto nylon and polyester film, using a #10 wire wrapped rod, with both the fresh liquid and aged liquid. The aged liquid needed heat to re-effect solution prior to application. All coatings resulted in white, streaky films upon drying and showed poor adhesion to the substrates.

CONTROL B—EVOH Solution in Acetic Acid and Water

Using the same equipment described in Example 1, 15 g (6 weight %) of the resin used in Example 1, 112 ml (47 weight %) glacial acetic acid, and 117.5 ml (47 weight %) water were charged into the reaction vessel. The mixture was heated, with agitation, to about 85° C. and held at that temperature for one hour. The solution was then cooled to room temperature.

The fresh solution was tested and found to have a strong odor. Commercial use of this material was not feasible. The resin precipitated out of solution within 24 hours in two thirds of the tests run for this example.

EXAMPLES 3-5 AND CONTROLS C-L

The following experiments were carried out using the equipment and EVOH resin described in Example 1, heating with agitation near the boiling points of the mixtures (approximately 80-90° C.) for one hour until solution was achieved. Stability was judged by examining the appearance of the liquids after cooling. Film quality was determined by drawing down the solutions using a #10 wire wrapped rod onto nylon film and evaporating the solvents.

In the following table the compositions of the respective solutions prepared in accordance with the invention and as control formulations are given (specifying the weight of the respective components thereof), together with the stability characteristics of the solutions and quality of the films drawn down therefrom. The composition and solution/film characteristics of the formulation described in Example 1 are given in the table for comparative purposes; the formulation of Example 1 was the best tested since it provided a stable solution and formed a good film which had no objectionable odor after drying:

COMPARATIVE STABILITY AND FILM QUALITY TEST

| Component | Example | | | Control | | | | | | | | | |
|---|---|---|---|---|---|---|---|---|---|---|---|---|---|
| | 1 | 3 | 4 | C | D | E | F | G | H | I | J | K | L |
| Resin | 10 | 10 | 10 | 10 | 10 | 10 | 10 | 10 | 10 | 10 | 10 | 10 | 10 |
| Alcohol | | | | | | | | | | | | | |
| MeOH | | | | 40 | | | | | | | | | |
| EtOH | | | | | 40 | | | | | | | | 20 |
| i-PrOH | | | | | | 40 | | | | | | 30 | |
| n-PrOH | 40 | | 40 | | | | | | | 40 | 30 | | |
| t-BuOH | | | | | | | 40 | | | | | | |
| s-BuOH | | 40 | | | | | | | | | | | |
| i-BuOH | | | | | | | | 40 | | | | | |
| n-BuOH | | | | | | | | | 40 | | | | |
| Acid | | | | | | | | | | | | | |
| HCOOH | | | | | | | | | | 10 | | | |
| HOAc | 10 | 10 | | 10 | 10 | 10 | 10 | 10 | 10 | | 10 | 10 | |
| Propionic Acid | | | 10 | | | | | | | | | | |
| Co-solvent | | | | | | | | | | | | | |
| Ethyl Acetate | | | | | | | | | | | | 10 | |
| Acetone | | | | | | | | | | | | | 20 |
| Water | 40 | 40 | 40 | 40 | 40 | 40 | 40 | 40 | 40 | 40 | 50 | 40 | 40 |
| Total | 100 | 100 | 100 | 100 | 100 | 100 | 100 | 100 | 100 | 100 | 100 | 100 | 100 |
| Stability | (c) | (d) | (c) | (a) | (b) | (b) | (b) | (a) | (a) | (d) | (e) | (f) | (f) |
| Film Quality | (h) | (h) | (h) | (g) | (g) | (g) | (g) | (g) | (g) | (g) | (i) | — | — |

Stability Key
(a) = Resin precipitated from solution immediately.
(b) = Solution became opaque overnight. Resin precipitated from solution within two weeks.
(c) = A clear, homogeneous solution was achieved for at least three months.
(d) = A clear, homogeneous solution was initially obtained. The solution began to become opaque after three weeks.
(e) = A clear solution was initially obtained. It turned milky white within 24 hours, indicating instability.
(f) = Resin precipitated from solution in 24 hours. Drawdowns were not attempted, since the stability was so poor.
Film Quality Key
(g) = A streaky uneven film with ridges, valleys and voids was obtained on nylon substrate.
(h) = An even, clear, homogeneous film was obtained on nylon substrate.
(i) = Drawdowns were made onto both nylon and polyester film. The coatings resulted in white, streaky films upon drying and showed poor adhesion to the substrate.

The novel EVOH coating of the present invention also bonds well to nylon ("PA"), and may then be coated with the PEI primer and bonded to ethylene/vinyl acetate copolymer ("EVA") to form:

PA/EVOH Coating/PEI Primer/EVA.

By a similar technique one can obtain:
PA/EVOH Coating/PEI Primer/Ionomer, wherein the ionomer is a polymeric resin such as Surlyn by DuPont.

The PEI primer may be applied either to the base substrate or to the secondary substrate. Thus, the overall multi-layer structure may be made in the reverse manner, for example:
EVA/PEI Primer/EVOH Coating/PA, and Ionomer/PEI Primer/EVOH Coating/PA.

The preceding examples are intended to illustrate the present invention. It will be understood that variations can be made therein without departing from the spirit and scope of the invention.

What is claimed is:

1. A coating composition useful for forming a liquid barrier resin, comprising a substantially homogenous system of the following components:
   (1) from 0.5 to 20 weight % of a copolymer of from 27 to 48 mole percent ethylene copolymerized with, correspondingly, 73 to 52 mole percent vinyl alcohol;
   (2) from 30 to 90 weight % of n-propanol or secondary butanol;
   (3) from 0.5 to 20 weight % of a monobasic or dibasic carboxylic acid containing from two or eight carbon atoms or an anhydride thereof, or a mineral acid; and
   (4) from 5 to 45 weight % of water.

2. The coating composition of claim 1, wherein the ethylene/vinyl alcohol copolymer is blended or grafted with mica, carboxyl groups or polyamide moieties.

3. A multi-layer structure comprising a paper of plastic substrate bonded to an EVOH coating prepared by deposition of the coating composition of claim 1.

4. The multi-layer structure of claim 3, in which the EVOH coating is bonded to the substrate by a primer selected from the group consisting of polyethyleneimines, organofunctional silanes, organofunctional titanates, or mixtures thereof.

5. A method for forming an EVOH barrier resin coating on a substrate, which comprises
   forming a substantially homogeneous coating solution of the following components:
   (1) from 0.5 to 20 weight % of a copolymer of from 27 to 48 mole percent ethylene copolymerized, correspondingly, with 73 to 52 mole percent vinyl alcohol;
   (2) from 30 to 90 weight % of n-propanol or secondary butanol;
   (3) from 0.5 to 20 weight % of a monobasic or dibasic carboxylic acid containing from two to eight carbon atoms or an anhydride thereof, or a mineral acid; and
   (4) from 5 to 45 weight % of water; and depositing a continuous film from said solution on the substrate.

6. The method of claim 5, wherein the EVOH coating is bonded to the substrate by a primer selected from the group consisting of polyethyleneimines, organofunctional silanes, organofunctional titanates, or mixtures thereof.

7. The coating composition of claim 1, wherein the composition comprises from 35 to 45 weight % of n-propanol or secondary butanol.

8. The coating composition of claim 7, wherein the composition comprises from 35 to 45 weight % of water.

9. The coating composition of claim 8, wherein the composition comprises from 5 to 15 weight % of the acid component.

* * * * *